(12) United States Patent
Luhar et al.

(10) Patent No.: US 12,061,497 B2
(45) Date of Patent: Aug. 13, 2024

(54) COMPUTING DEVICE HOLDER AND METHOD OF STORING THEREOF

(71) Applicant: Ingenio Aerospace Inc., Montreal (CA)

(72) Inventors: Parth Luhar, Montreal (CA); James Edward Bell, Montreal (CA)

(*) Notice: Subject to any disclaimer, the term of this patent is extended or adjusted under 35 U.S.C. 154(b) by 0 days.

(21) Appl. No.: 18/360,216

(22) Filed: Jul. 27, 2023

(65) Prior Publication Data
US 2024/0019897 A1    Jan. 18, 2024

Related U.S. Application Data (62) Division of application No. 17/103,435, filed on Nov. 24, 2020, now Pat. No. 11,755,070.

(60) Provisional application No. 62/945,314, filed on Dec. 9, 2019.

(51) Int. Cl.
| | |
|---|---|
| *F16B 2/22* | (2006.01) |
| *B60R 11/02* | (2006.01) |
| *F16M 11/10* | (2006.01) |
| *F16M 13/02* | (2006.01) |
| *G06F 1/16* | (2006.01) |
| *B60R 11/00* | (2006.01) |

(52) U.S. Cl.
CPC ............ *G06F 1/1632* (2013.01); *B60R 11/02* (2013.01); *F16B 2/22* (2013.01); *F16M 11/10* (2013.01); *F16M 13/022* (2013.01); *G06F 1/1681* (2013.01); *B60R 2011/0059* (2013.01); *Y10S 248/917* (2013.01)

(58) Field of Classification Search
CPC .... F16B 2/04; F16B 2/20; F16B 2/243; F16B 2/22; F16M 13/022
USPC ...... 248/689, 229.1, 229.13, 229.14, 229.15, 248/226.11, 231.21, 231.51, 231.61, 248/231.71, 316.1, 316.5, 316.6
See application file for complete search history.

(56) References Cited

U.S. PATENT DOCUMENTS

| | | | |
|---|---|---|---|
| 1,903,601 A | 4/1933 | Smolko | |
| 5,556,299 A | 9/1996 | Finke | |
| 5,921,669 A | 7/1999 | Taylor et al. | |
| 6,679,463 B1 | 1/2004 | Chen | |
| 7,607,627 B1* | 10/2009 | Mchatet | B60R 7/082 24/3.12 |
| 8,226,062 B2* | 7/2012 | Yu | F16M 11/10 248/316.1 |

(Continued)

OTHER PUBLICATIONS

Marcel Breuer Table from internet. Cited in the non-final rejection of U.S. Appl. No. 17/103,435 issued Sep. 8, 2022.

*Primary Examiner* — Alfred J Wujciak
(74) *Attorney, Agent, or Firm* — Anglehart et al.

(57) ABSTRACT

A computing device holder; it has a curved base comprising a flat upper part, wherein the curved base defines an inner space for receiving an edge of a table; a receiving portion for receiving the computing device; a connector connecting the receiving portion to the flat upper part; and a hinge connecting the connector to the receiving portion, wherein the connector allows the receiving portion to rotate around the longitudinal axis defined by the length of the connector, and wherein the hinge allows the receiving portion to rotate around the hinge from a first position where the receiving portion is orthogonal with respect to the flat upper part of the curved base to a second position where the receiving portion is parallel with respect to the flat upper part of the curved base.

9 Claims, 7 Drawing Sheets

(56) References Cited

U.S. PATENT DOCUMENTS

| | | |
|---|---|---|
| 8,226,281 B2 | 7/2012 | Wei |
| 8,469,325 B2 | 6/2013 | Yu |
| 9,115,740 B2 | 8/2015 | Chang |
| 9,206,943 B2 * | 12/2015 | Chang .................... F16M 13/00 |
| 9,695,849 B2 | 7/2017 | Zhou et al. |
| 9,791,098 B2 | 10/2017 | Boyer |
| 10,272,847 B1 | 4/2019 | Fan |
| 2006/0170817 A1 | 8/2006 | Wu |
| 2008/0296454 A1 | 12/2008 | Carnevali |
| 2013/0140413 A1 | 6/2013 | Bailey |
| 2014/0048662 A1 | 2/2014 | Ferris |
| 2014/0077056 A1 | 3/2014 | Ghosh |
| 2015/0286115 A1 * | 10/2015 | Koch ................. F16M 11/2078 248/230.4 |
| 2015/0286116 A1 | 10/2015 | Johnson, Sr. et al. |
| 2016/0257404 A1 | 9/2016 | Ferris |
| 2017/0223862 A1 | 8/2017 | Justiss et al. |
| 2019/0199386 A1 | 6/2019 | Balmer |
| 2019/0283685 A1 | 9/2019 | Zhang |

* cited by examiner

COMPUTING DEVICE HOLDER AND METHOD OF STORING THEREOF

The present patent application is a divisional patent application of U.S. patent application Ser. No. 17/103,435 filed on Nov. 24, 2020, which claims priority from U.S. provisional patent application No. 62/945,314 filed on Dec. 9, 2019, incorporated herein by reference.

TECHNICAL FIELD

The present disclosure relates to holders for receiving a computing device, and more particularly to holders for use in means of transport.

BACKGROUND

Holders used for receiving computing devices, such as a smartphone, for attachment to components of a means of transport, such as a vehicle, aircraft or boat, are best adequately secured such that the holder does not detach undesirably and cause injury to the driver or passengers during transit. Moreover, it would be advantageous for the holder to be of a compact configuration, and be developed for compact storage in order to reduce its space-occupancy when stored.

Finally, in the context of an aircraft, designing a holder that can be easily detached from the edge of the table and stored during lift off, landing and/or turbulence would be further advantageous.

SUMMARY

The present disclosure relates to a holder, for receiving a computing device, for use in an aircraft, such as a private jet, where the holder is adapted to be secured onto an edge of a table of the jet. However, it will be understood that the holder does not have to be limited to use in an aircraft, and can be easily attached to any other table without departing from the present teachings.

The holder includes a receiving portion, for receiving a computing device, and a base for securing the holder onto the edge of a table.

The receiving portion possesses at least two degrees of freedom with respect to its base such that the receiving portion can easily rotate about and fold to overlap the base for, e.g., reducing the space-occupancy during storage, adjusting the tilt angle and direction of the screen of the received computing device based on the user's preferences when viewing the screen, etc.

Moreover, the base of the holder is composed of a flat upper part, a bottom part and a floating base, each interconnected with one-another, such that applying force to, for instance, the bottom part, causes the base to shift into a locked position to secure the base to the edge of the table, where sufficient force applied by the user to the base (e.g. the bottom part of the base) would result in the base releasing the edge of the table (thereby reducing the risk that the holder is undesirably disconnected from the base).

A broad aspect of the present disclosure is a computing device holder configured for fastening onto an edge of a table of an aircraft. The holder includes a curved base comprising a flat upper part, wherein the curved base defines an inner space for receiving an edge of a table and securing the holder to the received edge of the table; a receiving portion for receiving the computing device; a connector connecting the receiving portion to the flat upper part of the curved base; and a hinge connecting the connector to the receiving portion, wherein a length of the hinge is orthogonal to a longitudinal axis defined by a length of the connector, wherein the connector allows the receiving portion to rotate around the longitudinal axis defined by the length of the connector, and wherein the hinge allows the receiving portion to rotate around the hinge from a first position where the receiving portion is orthogonal with respect to the flat upper part of the curved base to a second position where the receiving portion is parallel with respect to the flat upper part of the curved base.

In some embodiments, the receiving portion may include a face and an outer lip defining an inner space for receiving the computing device.

In some embodiments, the hinge may allow for the receiving portion to rotate a maximum of 90 degrees around the hinge.

In some embodiments, a width of the curved base may be at least half of the width of the receiving portion.

In some embodiments, the curved base may include a bottom part, wherein the flat upper part and the bottom part may be connected by a hinge forming a jaw defining the inner space, wherein rotation of the bottom part around the hinge may result in the bottom part transitioning from a first position to a second position, wherein the inner space may be reduced when transitioning from the first position to the second position, and wherein the reducing of the inner space may secure the edge of the table in the jaw.

In some embodiments, the holder may include a floating base that is joined at an end of the floating base to an extension of the flat upper part with a hinge.

In some embodiments, the floating base may be joined to the bottom part through a lever that swings between a first position and a second position as the bottom part transitions from the first position to the second position respectively, the transitioning of the bottom part from the first position to the second position causing the floating base to rotate towards the flat upper part, wherein the lever may lock the bottom part in the second position when the lever is in the second position.

In some embodiments, the curved base may include a compressible pad that compresses when the edge of the table is received in the inner space of the curved base.

In some embodiments, the extension of the flat upper part may be curved and may follow the shape of an arched section of the bottom part such that the extension of the flat upper part configured to nest with the arched section of the bottom part.

In some embodiments, a compressible pad may cover at least a portion of an inner wall of the flat upper part of the curved base.

Another broad aspect is a jaw for clamping onto an edge of a table. The jaw includes a flat upper part; a bottom part connected to the flat upper part through a hinge; and a floating base connected at an end to the flat upper part, and connected to the bottom part, wherein shifting the bottom part and the floating base from a first position to a second position causes an inner space, for receiving the edge of the table, defined by the flat upper part, the bottom part and the floating base, to reduce in width, thereby causing the jaw to close onto the edge of the table.

In some embodiments, the floating base may be connected to the bottom part through a lever, and wherein the shifting the bottom part and the floating base from a first position to a second position may cause the lever to swing from a first position to a second position, and wherein the lever may lock the bottom part and the floating base in the second position when the lever is in the second position.

In some embodiments, the flat upper part may include an extension, and wherein the floating base may be connected to the extension of the flat upper part through a hinge.

In some embodiments, the extension of the flat upper part may be curved and may follow the shape of an arched section of the bottom part such that the extension of the flat upper part may be configured to nest with the arched section of the bottom part.

In some embodiments, a surface of the floating base facing the flat upper part may be at least partially covered with a compressible pad.

In some embodiments, the compressible pad may include rubber and foam.

In some embodiments, a compressible pad may cover at least a portion of an inner wall of the flat upper part of the curved base.

Another broad aspect is a holder for receiving a computing device including the jaw as defined herein for locking onto an edge of a table.

Another broad aspect is a table located in an aircraft including the holder as defined herein, wherein the holder is fastened to an edge of the table.

Another broad aspect is a method of storing a holder for receiving a computing device. The method includes rotating a receiving portion, for receiving a computing device, of a holder about a first axis that is parallel with the width of the receiving portion such that a face of the receiving portion overlaps and is parallel with a flat upper part of a base of the holder; and releasing the base from an edge of a table.

In some embodiments, the method may include rotating the receiving portion about a second axis that is orthogonal to the first axis until a first side of the receiving portion that receives the computing device is in a position that the side for receiving the computing device faces away from the base of the holder.

In some embodiments, the receiving portion may be limited to rotating no more than 90 degrees around the first axis.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to a holder for receiving a computing device, where its components can be folded onto themselves in order to reduce space-occupancy, e.g., for easier storage. Moreover, the holder may have a curved base for closing onto an edge of a table and securing thereto, where only force directed to a portion of the base (e.g. the bottom part of the base) results in the release by the base of the edge of the table.

Definitions

The term "table" as used herein refers to a flat surface with an edge on which, e.g., items can be placed, and include, for instance, a night table, a side table, a countertop, a kitchen table, a tray table, a flat ledge, foldable or non-foldable, retractable and non-retractable, etc. For instance, the table may be located in an aircraft next to or in front of a passenger seat (e.g. stowable in the front seat) or located in a boat, a vehicle, etc.

The term "aircraft" as used herein may refer to, e.g., a plane, a jet, a helicopter, etc.

The term "computing device" as used herein includes, but is not limited to, a smartphone, a tablet, a laptop, etc.

The term "hinge" as used herein refers to a movable joint or mechanism that connects linked objects or components for causing one or more of the objects or components to rotate or swing with respect to one another.

Figure 1:
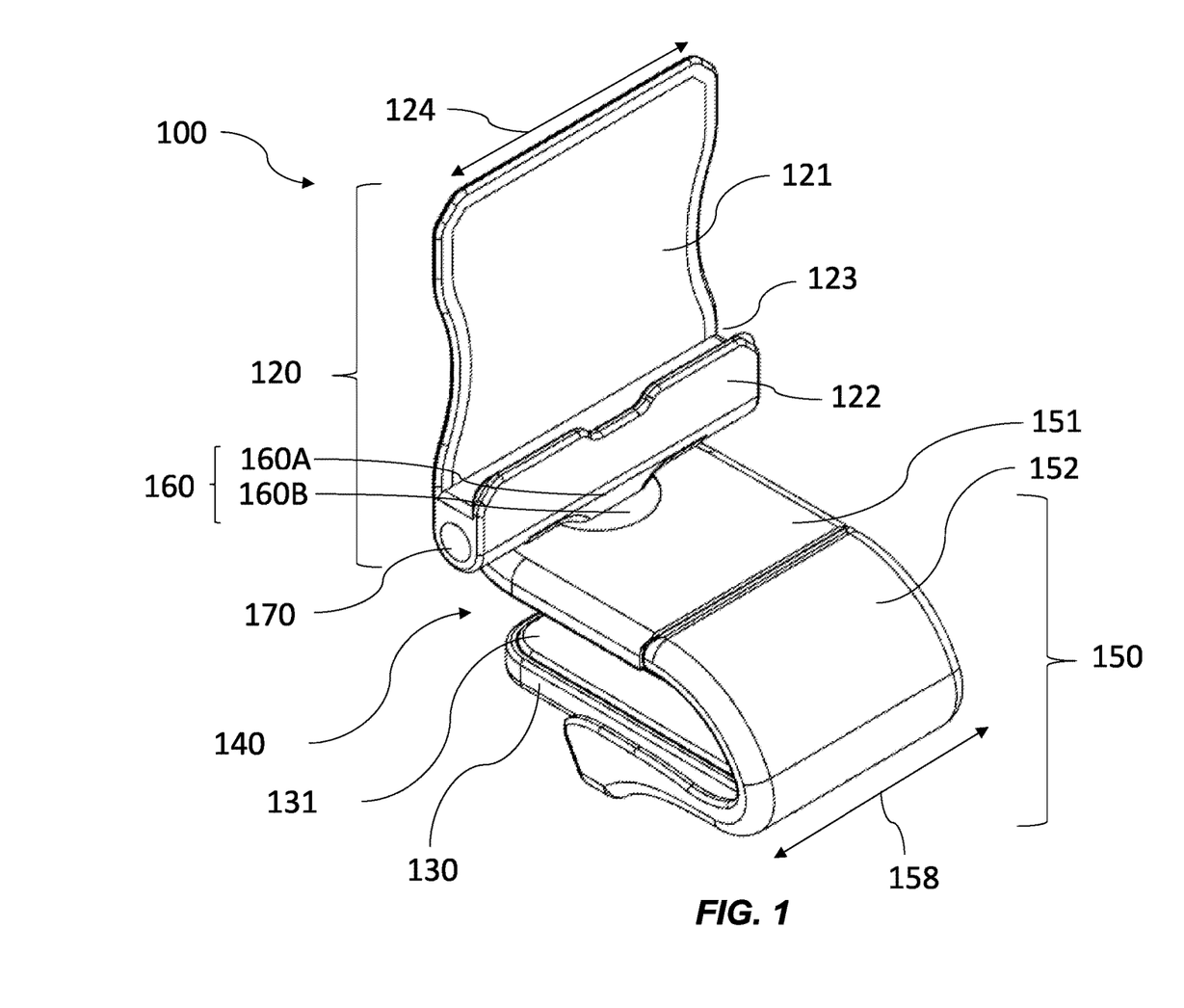
FIG. 1 is a drawing of a perspective view of an exemplary holder for receiving a computing device with an exemplary receiving portion in a first position.
Figure 2:
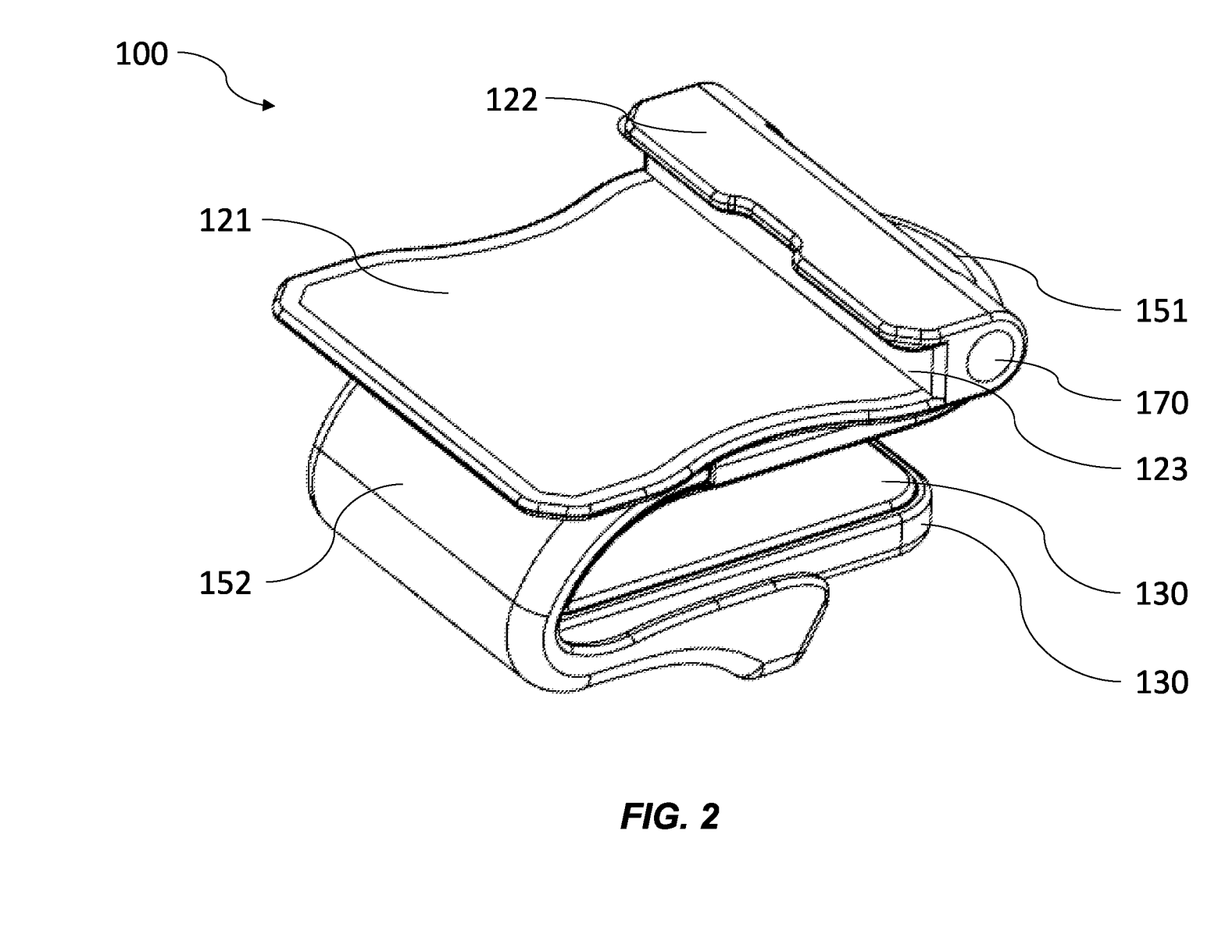
FIG. 2 is a drawing of a perspective view of the exemplary holder for receiving a computing device with the exemplary receiving portion in a second position, for reducing space-occupancy of the holder.
Figure 3:
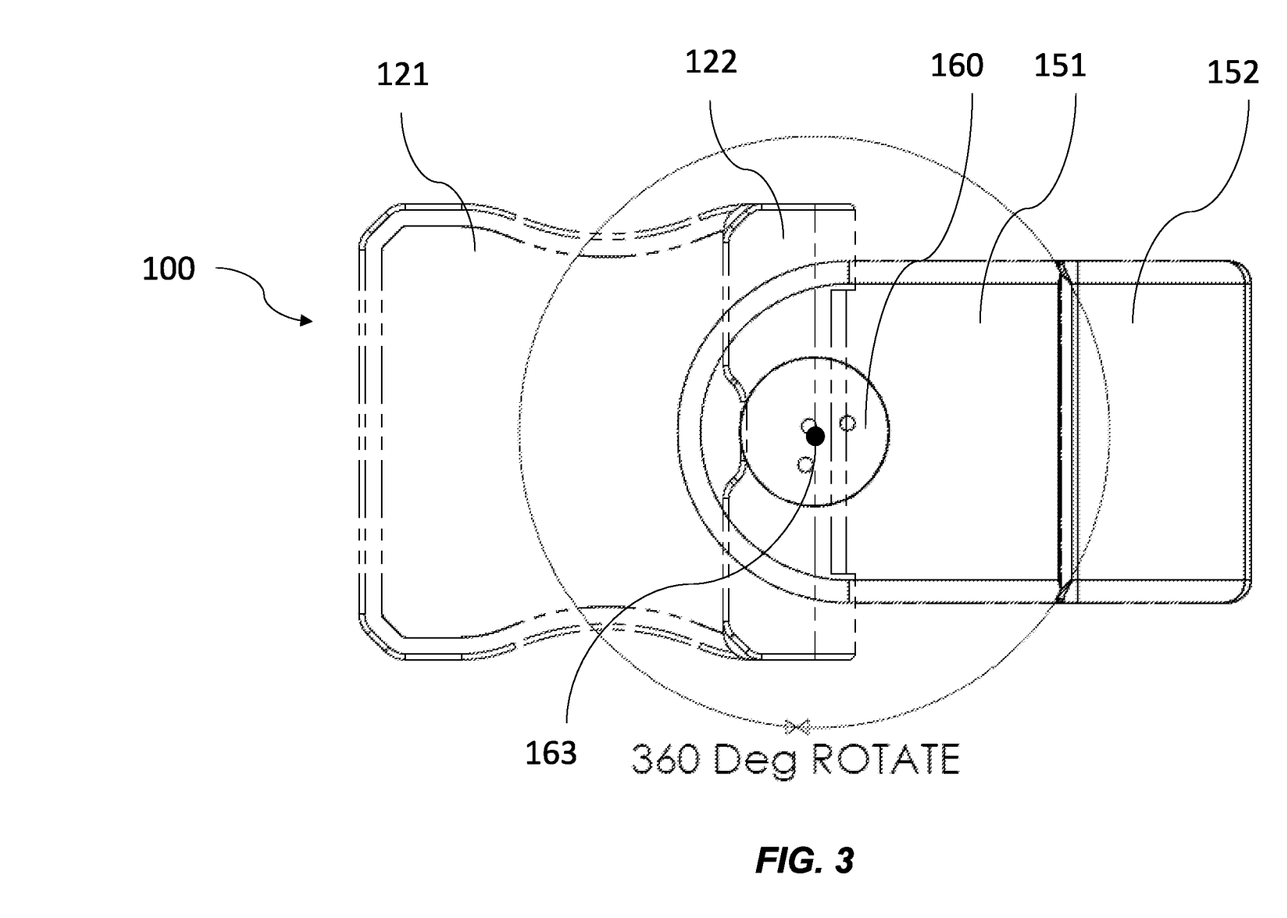
FIG. 3 is a drawing of a top-down view of an exemplary holder showing an exemplary range of rotation of an exemplary receiving portion, about a longitudinal axis defined by a length of an exemplary connector.

An Exemplary Holder for Receiving a Computing Device:

Reference will now be made to FIGS. 1-3, illustrating an exemplary holder 100 for receiving a computing device.

The holder 100 includes a receiving portion 120, a curved base or jaw 150, a hinge 170 and a connector 160. The holder 100 may include a floating base 130.

The receiving portion 120 may include a face 121 and an outer lip 122. The face 121 and the outer lip 122 define a space 123 for receiving the computing device, where the back of the computing device may rest on the face 121, the computing device secured between the face 121 and the outer lip 122. The receiving portion 120 has a width 124, where the width may, e.g., be proximate to the width of the computing device. As such, the dimensions of the receiving portion 120 may vary as a function of the type of computing device that may be received therein.

In some examples, instead of an outer lip 122, the receiving portion 120 may include a plurality of protrusions, or upward-curved hooks for receiving the computing device and for preventing the computing device from sliding off from the receiving portion 120 (not shown).

Figure 5A:
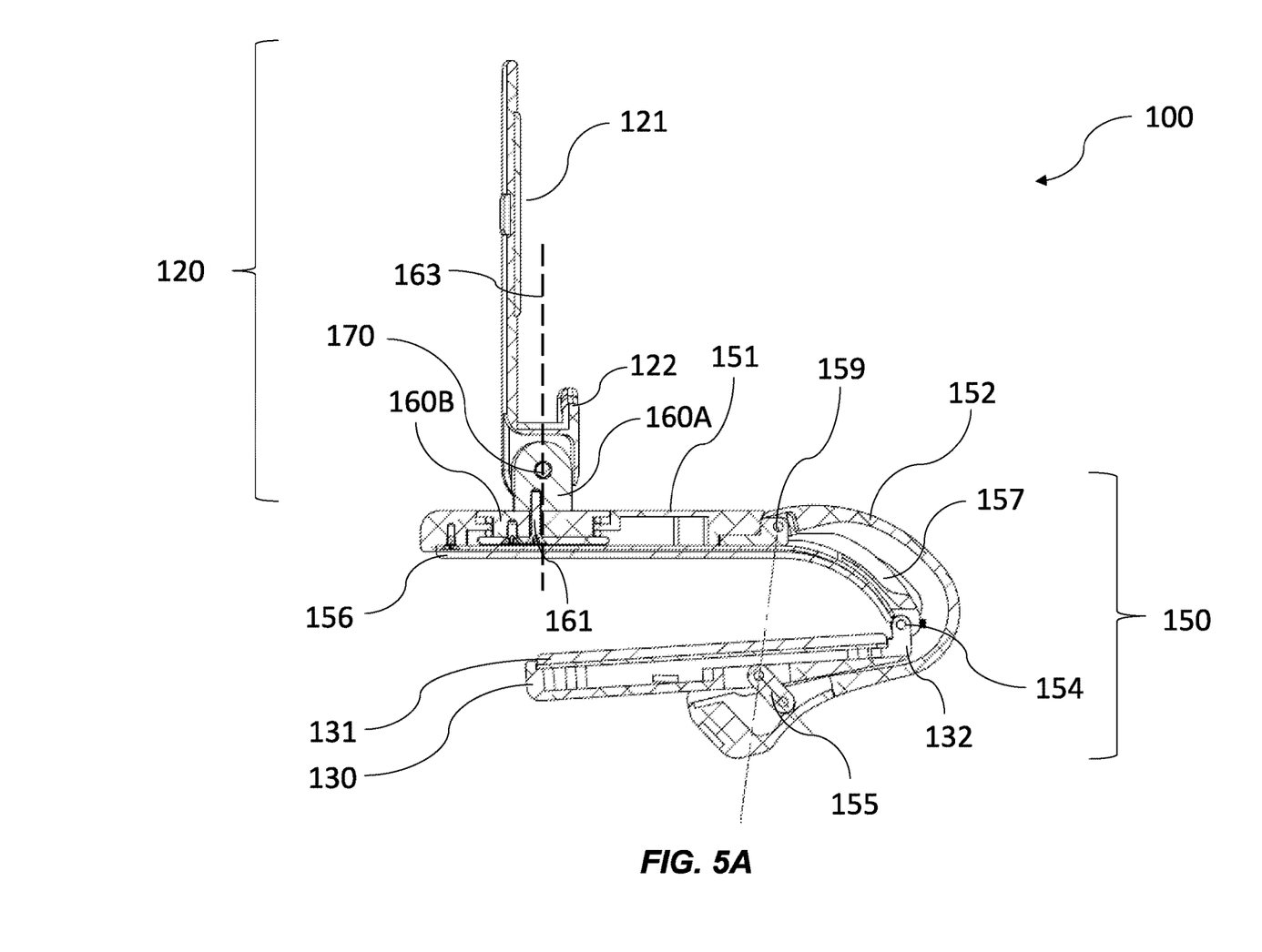
FIG. 5A is a drawing of a cross-sectional side view of an exemplary holder an unlocked configuration.
Figure 5B:
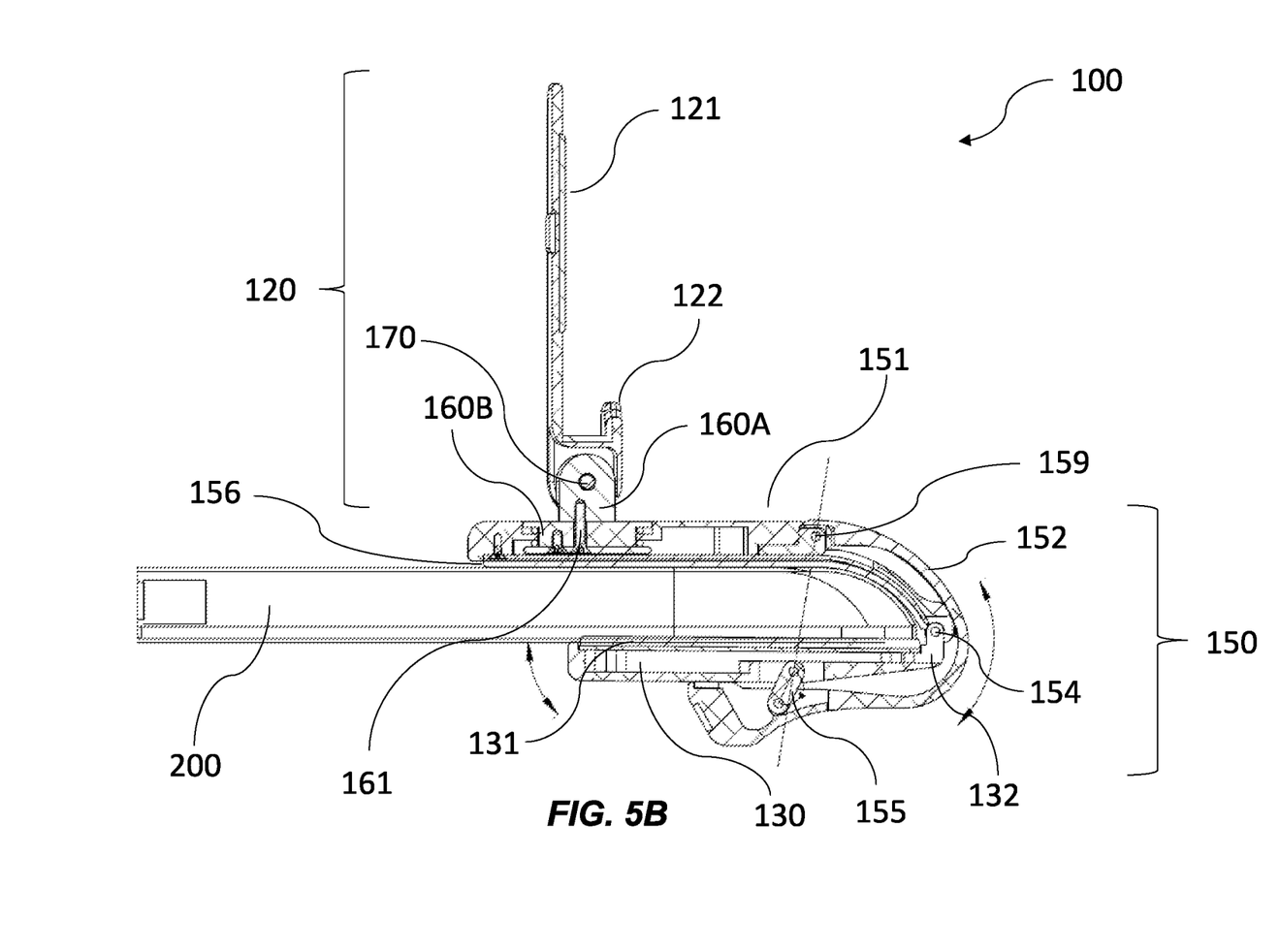
FIG. 5B is a drawing of a cross-sectional side view of an exemplary holder in a locked configuration.

The curved base or jaw 150 includes a flat upper part 151. The curved base 150 may include a bottom part 152, where the flat upper part 151 and the bottom part 152 may be connected trough a hinge 159 (FIGS. 5A and 5B). The flat upper part 151 may include an extension 157. The flat upper part 151 may include a compressible pad 156 that covers at least a part of the inner surface of the flat upper part 151 that contributes in defining the inner space 140. The curved base 150 has a width 158.

In some examples, an end of the bottom part 152 may be thicker than the part of the bottom part 152 that is joined to the flat upper part 151.

In some examples, the width 158 of the curved base 150 may be proximate to the width 124 of the receiving portion 120. In some examples, the width 158 of the curved base 150 may be at least equal to half of to the width 124 of the receiving portion 120.

The connector 160 may have a base 160B and a neck 160A, where the neck 160A connects the base 160B to the receiving portion 120. The connector 160 may have a pin 161 for further connecting the connector 160 to the flat upper part 151 of the curved base 150. The connector 160 may also include a circular plate that is connected to the base 160B and the neck 160A through, e.g., the pin 161. The pin 161 may also create rotational resistance for smooth rotation of the receiving portion 120 by causing further compression of components joined by the pin 161. The connector 160 defines a longitudinal axis 163 that is parallel with the length of the connector 160. The base 160B may have a disc or cylindrical shape, may be a bolt, etc.

The floating base 130 may include a compressible pad 131.

The connector 160 connects the receiving portion 120 to the flat upper part 151 of the curved base 150. The connector 160 may be joined to the flat upper part 151 such that it can rotate freely as shown in FIG. 3 around the longitudinal axis 163. As such, the rotation of the connector 160 results in the rotation of the receiving portion 120, where, for example, the receiving portion 120 may perform a 360-degree rotation around the longitudinal axis 163. In other examples, the connector 160 may be fixed to the flat upper part 151 of the curved base 150. In these examples, the connection between the connector 160 and the receiving portion 120 may be such that the receiving portion 120 may rotate around the connector 160 (and its longitudinal axis 163).

Figure 4:
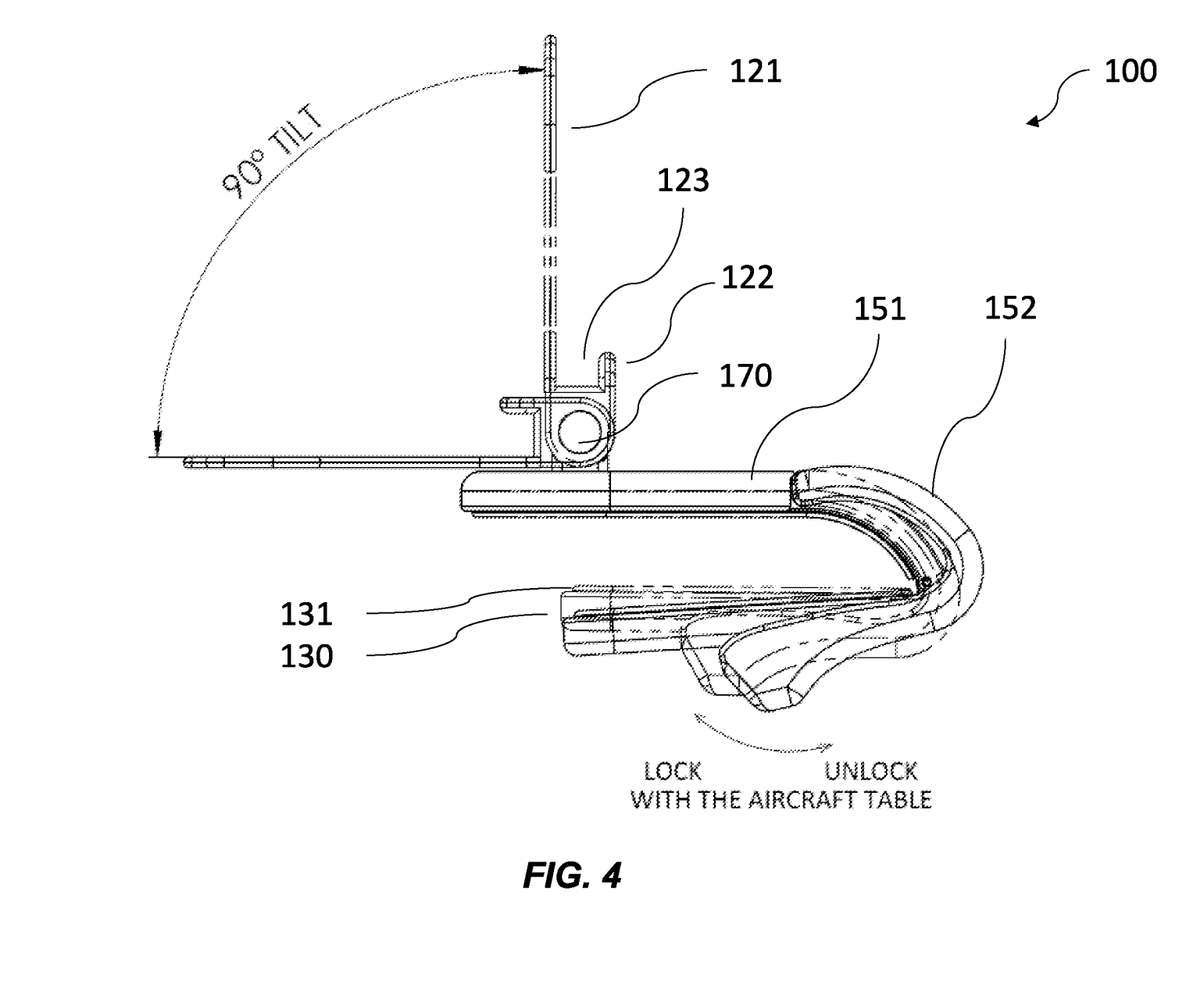
FIG. 4 is a drawing of a side view of an exemplary holder showing an exemplary range of rotation of an exemplary receiving portion about an exemplary hinge.

The hinge 170 may be located between the connector 160 and the receiving portion 120. The length of the hinge 170 is orthogonal (including almost orthogonal) to the length of the connector 160. The receiving portion 120 is free to rotate around the hinge 170, as shown in FIG. 4. In some examples, the range of motion may be limited (e.g., as shown in FIG. 4, limited to 90 degrees—it will be understood that a limitation to any range of motion may be provided in accordance with the present teachings).

Therefore, it will be understood that the combination of the hinge 170 and the connector 160 provide the receiving portion 120 with two degrees of motion, where the receiving portion 120 can rotate about the length of the hinge 170, and about the longitudinal axis 163 of the connector 160. This dual-degree of motion may allow a user to adjust the tilt of the receiving portion on which the computing device is resting, and to rotate the receiving portion 120 in a position such that the receiving portion 120 overlaps the curved base 150, to reduce space-occupancy for, e.g., storage (reference is made to FIG. 2). As shown in FIG. 1, the receiving portion 120 is in a first position where it is orthogonal with the flat upper part 151 of the curved base 150. In FIG. 2, the receiving portion 120 is in a second position where it is parallel with the flat upper part 151 of the curved base 150.

The curved base 150 defines an inner space 140 for receiving an edge of a table. The edge of the table fits into the inner space 140 and is secured, by the curved base 150, within the inner space 140, as further described herein.

An Exemplary Jaw or Curved Base:

The exemplary jaw or curved base 150 is for securing onto an edge of a table.

It will be understood that other components, aside from a receiving portion 120 for receiving a computing device, can be connected to the jaw 150, such that the jaw 150 secures the component, attached to the jaw 150, to the edge of the table. For instance, the jaw 150 can be connected to a light, a fan, a desktop, etc.

Reference is now made to FIGS. 5A and 5B. FIG. 5A shows an exemplary holder 100 with an exemplary jaw 150 in an open position. FIG. 5B shows an exemplary holder 100 with an exemplary jaw 150 in a closed position.

FIG. 5A shows the jaw 150 in an unlocked configuration, where an edge of a table 200 can be received in the jaw 150.

FIG. 5B shows the jaw 150 in a locked configuration, where the edge of the table 200 is secured in the inner space 140 of the jaw. The space 140 of the jaw 150 is reduced in the locked configuration than when compared to the unlocked configuration. In the locked configuration, the jaw 150 is pressing onto the sides of the table 200.

The jaw 150 includes a flat upper part 151 and a bottom part 152. The jaw 150 may include a floating base 130. A compressible pad 131 may cover at least part of the floating base 130 that partially defines the inner space 140. A compressible pad 156 may also cover an inner side of at least a part of the flat upper part 151.

In some examples, the compressible pad 131 and/or the compressible pad 156 may be made from a soft deformable material such as rubber (e.g. Buna-N) and foam (e.g. EPDM), a combination thereof, etc., in order to compress as the jaw 150 presses down onto the table 200, while being of a material that does not to damage the table as the jaw 150 presses down onto the table.

The flat upper part 151 may be connected to the bottom part 152 through a hinge 159. As such, the bottom part 152 can rotate about the hinge 159, increasing or decreasing the inner space 140 for closing onto or releasing the table 200.

The floating base 130 may be connected to the flat upper part 151 through a hinge 154. The floating base 130 may be connected to the flat upper part 151 at its end 132, the end that is located near the pit of the curved form of the bottom part 152. The flat upper part 151 may have an extension part 157, where the floating base 130 may be connected to the extension part 157 (e.g. the end of the extension part 157) through the hinge 154.

In some embodiments, the extension part 157 may be thin and curved such that it is shaped to nest with the curved portion of the bottom part 152 when the jaw 150 transitions from an unlocked or open configuration to a locked or closed configuration.

The floating base 130 may be connected to the bottom part 152 through a lever 155, e.g. the lever 155 can be joined to the bottom part 152 and to the floating base 130, such that movement of the bottom part 152 would cause the lever 155 to apply a force to the floating base 130, causing the floating base 130 to move under the applied force, and vice versa. The lever 155 may be joined, e.g., midway through the length of the floating base 130. In some embodiments, there may be more than one lever 155 connecting the floating base 130 to the bottom part 152.

In an unlocked configuration as shown in FIG. 5B, the lever may be in a position where its axis of rotation is not over-center.

As such, as a user applies force to, e.g., the bottom part 152 (e.g. upward force) to cause the jaw 150 to close onto an edge of a table 200, the bottom part 152 applies a force to the lever 155, causing the lever 155 to swing to a second position where the axis of rotation of the lever 155 is over-center, as shown in FIG. 5B. In the over-center position, the lever 155 is locked, locking the jaw 150 in the locked configuration, unless a sufficient force is applied to open the jaw 150 (e.g. downward force extended onto the bottom part 152), thereby causing the lever 155 to swing back into a position where the axis of rotation of the lever 155 is not over-center.

The swinging of the lever 155 causes a force to be applied by the lever 155 onto the floating base 130, in addition to the force applied by the bottom part 152 onto the floating base 130 as a force is applied by a user onto the bottom part 152. The force(s) applied to the floating base 130 cause the floating base 130 to rotate about the hinge 154 that joins the floating base 130 to the flat upper part 151. The floating base 130 rotates upwards, reducing the inner space 140. This reduction in inner space 140 results in edge of the table 200 to be secured between the floating base 130 and the flat upper part 151 of the jaw 150. The lever 155, in its locked configuration (e.g. axis of rotation is over-center), prevents the jaw 150 from opening and releasing the edge of the table 200 unless sufficient force with proper direction is applied to the jaw 150 (e.g. the bottom part 152 of the jaw 150). However, it will be understood that even though the present example shows a lever 155 acting as a locking mechanism for maintaining the jaw 150 in its closed position to grip onto the edge of the table 200, other mechanisms to lock the jaw 150 in the closed configuration may be used. For instance, the end of the floating base 130 that nests in the pit of the curved portion of the bottom part 152 may have such a shape that the end of the floating base 130 nests in the pit of the curved portion of the bottom part 152, where the pit of the curved portion of the bottom part 152 may have a protrusion (e.g. or a depressible abutment) that impedes the release of the end of the floating base 130 unless sufficient force is applied.

As such, the jaw 150 (or the holder 100) may be properly secured to an edge of a table of an aircraft, avoiding the jaw 150 or the holder 100 from being dislodged, while taking a small footprint due to its compact configuration.

In some examples, the flat upper part 151 and the bottom part 152 may be made from metal, such as aluminium.

An Exemplary Method of Storing a Holder:

In some examples, the holder may be stored, e.g., when located on an aircraft, when it is no longer used, or when landing the aircraft. The holder's configuration allows it to be stored in a compact form, such that it reduces its space occupancy. For instance, the receiving portion of the holder folds such that its face overlaps with the base of the holder.

Figure 6:
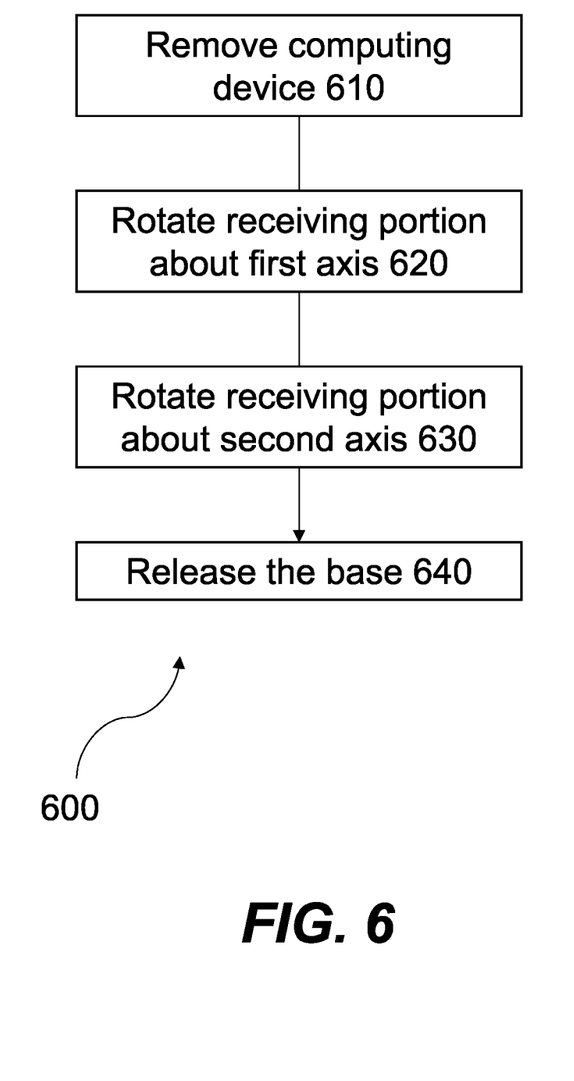
FIG. 6 is a flowchart diagram of an exemplary method for storing an exemplary holder.

Reference will now be made to FIG. 6, illustrating an exemplary method 600 for storing a holder for receiving a computing device. For purposes of illustration, reference will be made to holder 100. However, it will be understood that any other holder in accordance with the present teachings may be used or subject to the present method without departing from the present teachings.

Optionally, the computing device can be removed from the receiving portion 120 of the holder 100 at step 610.

The receiving portion 120 of the holder 100 is then rotated about a first axis (e.g. rotated about the hinge 170) until the face 121 of the holder 100 overlaps with the base 150 (e.g. its flat upper part 151), where the face 121 can be parallel (including almost parallel) with the flat upper part 151 of the base 150, as shown in FIG. 2. In some examples, the amount of rotation that the receiving portion 120 may do around the first axis of rotation may be limited to, for instance, 90 degrees (however, it will understood that other amounts of restriction may be contemplated without departing from the present teachings), the restriction, e.g., resulting from the configuration of the hinge 170, the shape of receiving portion 120 that is joined to the hinge 170, etc.

In some examples, e.g. prior to rotating about the first axis, the receiving portion 120 may also rotate about a second axis, where the second axis is orthogonal with the first axis at step 630. For instance, the second axis may be the longitudinal axis 163 defined by the length of the connector 160. The rotation about the second axis results in the holder 150 changing the direction towards which the computing device, when placed in the receiving portion, is facing.

When the holder 100 is to be stored, the receiving portion 120 can be rotated such that its face 121 is facing away from the curved portion of the curved base 150, such that when the receiving portion 120 rotates about the first axis, the side of the receiving portion 120 that is configured to receive the computing device faces away from the base 150, as shown, e.g., in FIG. 2. In some examples, when the side of the receiving portion 120 that receives the computing device is facing the curved portion of the base 150, this may be the equivalent of a rotation of around 180 degrees around the second axis. A rotation of 90 degrees of the receiving portion 120 around the first axis may then follow.

The base 150 is then released, allowing the edge of the table 200 from being removed from the inner space 140 of the base 150 at step 640.

In some examples, the release of the base 150 may be achieved by applying a force (e.g. a downward force) onto the bottom part 152 of the base 150. The applied force causes the lever 155 to swing to a position where its axis of rotation is not over-center, also resulting in the floating base 130 to tilt downward, thereby increasing the inner space 140 such that the edge of the table is released from the base 150.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A computing device holder configured for fastening onto an edge of a table of an aircraft comprising:
   a curved base comprising a flat upper part, wherein the curved base defines an inner space for receiving an edge of a table and securing the holder to the received edge of the table;
   a receiving portion for receiving the computing device;
   a connector connecting the receiving portion to the flat upper part of the curved base; and a hinge connecting the connector to the receiving portion, wherein a length of the hinge is orthogonal to a longitudinal axis defined by a length of the connector, wherein the connector allows the receiving portion to rotate around the longitudinal axis defined by the length of the connector, and wherein the hinge allows the receiving portion to rotate around the hinge from a first position where the receiving portion is orthogonal with respect to the flat upper part of the curved base to a second position where the receiving portion is parallel with respect to the flat upper part of the curved base, wherein the curved base further comprises a bottom part, wherein the flat upper part and the bottom part are connected by a hinge forming a jaw defining the inner space, wherein rotation of the bottom part around the hinge results in the bottom part transitioning from a first position to a second position, wherein the inner space is reduced when transitioning from the first position to the second position, and wherein the reducing of the inner space secures the edge of the table in the jaw.

2. The holder as defined in claim 1, wherein the receiving portion comprises a face and an outer lip defining an inner space for receiving the computing device.

3. The holder as defined in claim 1, wherein the hinge allows for the receiving portion to rotate a maximum of 90 degrees around the hinge.

4. The holder as defined in claim 1, wherein a width of the curved base is at least half of the width of the receiving portion.

5. The holder as defined in claim 1, further comprising a floating base that is joined at an end of the floating base to an extension of the flat upper part with a hinge.

6. The holder as defined in claim 5, wherein the floating base is joined to the bottom part through a lever that swings between a first position and a second position as the bottom part transitions from the first position to the second position respectively, the transitioning of the bottom part from the first position to the second position causing the floating base to rotate towards the flat upper part, wherein the lever locks the bottom part in the second position when the lever is in the second position.

7. The holder as defined in claim 5, wherein the curved base comprises a compressible pad that compresses when the edge of the table is received in the inner space of the curved base.

8. The holder as defined in claim 5, wherein the extension of the flat upper part is curved and follows the shape of an arched section of the bottom part such that the extension of the flat upper part configured to nest with the arched section of the bottom part.

9. The holder as defined in claim 1, wherein a compressible pad covers at least a portion of an inner wall of the flat upper part of the curved base.

* * * * *